United States Patent
Seitzer

(10) Patent No.: US 10,065,598 B2
(45) Date of Patent: Sep. 4, 2018

(54) SEAT-BELT SHAFT AND SEAT-BELT RETRACTOR

(71) Applicant: TRW Automotive GmbH, Alfdorf (DE)

(72) Inventor: Dominik Seitzer, Waldstetten (DE)

(73) Assignee: TRW Automotive GmbH (DE)

( * ) Notice: Subject to any disclaimer, the term of this patent is extended or adjusted under 35 U.S.C. 154(b) by 235 days.

(21) Appl. No.: 14/888,946

(22) PCT Filed: May 12, 2014

(86) PCT No.: PCT/EP2014/001269
§ 371 (c)(1),
(2) Date: Nov. 4, 2015

(87) PCT Pub. No.: WO2014/183858
PCT Pub. Date: Nov. 20, 2014

(65) Prior Publication Data
US 2016/0114761 A1    Apr. 28, 2016

(30) Foreign Application Priority Data

May 14, 2013  (DE) .................. 10 2013 008 150

(51) Int. Cl.
*B60R 22/34*        (2006.01)

(52) U.S. Cl.
CPC ...... *B60R 22/34* (2013.01); *B60R 2022/3427* (2013.01)

(58) Field of Classification Search
CPC .................. B60R 22/34; B60R 2022/3427
See application file for complete search history.

(56) References Cited

U.S. PATENT DOCUMENTS

| | | | |
|---|---|---|---|
| 4,119,281 A | 10/1978 | Paitula et al. | |
| 4,509,707 A * | 4/1985 | Ernst ....................... | B60R 22/36 242/376.1 |
| 5,002,236 A * | 3/1991 | Cotter ..................... | B60R 22/34 242/376 |
| 5,451,012 A * | 9/1995 | Kleinhans ............... | B60R 22/34 242/587.1 |
| 5,588,609 A | 12/1996 | Ohsumi | |
| 5,921,495 A | 7/1999 | Doose et al. | |

FOREIGN PATENT DOCUMENTS

| | | |
|---|---|---|
| DE | 3840108 | 5/1990 |
| DE | 20008314 | 10/2000 |
| DE | 102010051066 | 5/2012 |

\* cited by examiner

*Primary Examiner* — Sang K Kim
(74) *Attorney, Agent, or Firm* — Tarolli, Sundheim, Covell & Tummino LLP

(57) ABSTRACT

In a belt shaft (12) of a belt retractor (42) of a seat belt comprising a base member (10) extending in the longitudinal direction of an axis of rotation (D) to which the seat belt is fastened, the base member (10) is a stamped and bent part.

11 Claims, 4 Drawing Sheets

SEAT-BELT SHAFT AND SEAT-BELT RETRACTOR

RELATED APPLICATIONS

This application corresponds to PCT/EP2014/001269, filed May 12, 2014, which claims the benefit of German Application No. 10 2013 008 150.5, filed May 14, 2013, the subject matter, of which are incorporated herein by reference in their entirety.

BACKGROUND OF THE INVENTION

The invention relates to a belt shaft for a belt retractor of a seat belt comprising a base member extending in the longitudinal axis of an axis of rotation to which base member the seat belt is fastened. The invention further relates to a belt refractor for a seat belt in a vehicle.

Belt shafts for seat belts in vehicles are commonly manufactured as die casting pant. The manufacture of said component parts is very complicated, however. Especially when mounting structures for webbing or torque transmission profiles for locking the belt shaft are provided, the manufacture in an injection molding method is very complex. Moreover, the belt shafts have to be dimensioned to be very large so as to achieve sufficient stability.

SUMMARY OF THE INVENTION

It is the object of the invention to provide a belt shaft for a seat belt which can be manufactured in a simpler and cheaper way and at the same time exhibits improved stability. It is another object of the invention to provide a belt retractor comprising said belt shaft.

For achieving the object it is provided in a belt shaft of a belt retractor of a seat belt comprising a base member extending in the longitudinal direction of an axis of rotation to which the belt is fastened that the base member is a stamped and bent part. In accordance with the invention, the base member is not a die-casting part but a stamped and bent part, preferably made of sheet metal. Such stamped and bent part can be easily manufactured of planar plate-shaped sheet metal. A blank is stamped out of the sheet metal and is subsequently bent to the shape of the base member. This enables substantially easier end thus cheaper manufacture. In addition, due to the higher material strength, a stamped and bent part made of metal requires less space while exhibiting the same stability as a conventional belt shaft.

In order to mounting the webbing the base member for example has two holding fixtures, which are provided at each of the axial ends of the base member, for a webbing retaining element connected to webbing. The webbing is not fastened directly to the base member but to an additional webbing retaining element adapted to be fixed on the base member. In this way the base member can have a substantially simpler configuration, as no separate mounting structure for the webbing but merely holding fixtures are required in which the webbing retaining element can be fixed.

Each of the holding fixtures can have inserting passages extending transversely to the axis of rotation and being open on one side for receiving the webbing retaining element. The webbing retaining element can be inserted into said passages in the holding fixtures, for example after mounting the base member in a belt retractor. Hence separate feeding of webbing and, respectively, of the webbing retaining element and the base member is possible.

In particular, the inserting passages extend in the radial direction with respect to the axis of rotation so that the webbing element is substantially fixed on the axis of rotation in the state inserted in the inserting passages, thus causing a centric load transmission from the webbing retaining element to the base member to occur.

The holding fixtures can be formed, for example, by lateral tabs bent in U-shape at the axial ends of the base member. This permits simple manufacture of the inserting passages which are formed by the two legs of the tabs bent in U-shape.

The belt shaft further may include an oblong webbing retaining element having a retaining portion for webbing as well as two retaining projections protruding in the longitudinal direction, the retaining projections being inserted in the passages of the holding fixtures of the base member. The retaining portion is configured, for example, so that it is adapted to extend through a loop of the webbing and simple mounting of the webbing on the webbing retaining element can be realized. When the webbing is fixed on the webbing retaining element, simple mounting of the webbing retaining element on the base member is possible by inserting the webbing retaining element into the holding fixtures and, respectively, into the passages of the holding fixtures. Thus the webbing can be fastened to the belt shaft without using tools. Especially easy replacement of the webbing is possible as the webbing retaining element is simply removed from the holding fixtures of the base member. During regular operation of a belt retractor the webbing is safely retained on the belt shaft. When the webbing is completely unwound, the webbing retaining element is pulled into the holding fixtures by tensile force acting on the webbing. When the webbing is partly wound up, the retaining element is additionally fixed on the base member by the windings of the webbing. Since the retaining projections are fixed in the holding fixtures, the webbing does not glide off the webbing retaining element in the longitudinal direction, either.

Moreover, the belt shaft may include two torque transmission profile members attached to the base member, especially to the holding fixtures, in the direction of the axis of rotation. When the holding fixtures are formed by bent tabs, the latter are not only open to the inside so that the retaining portion of the webbing may protrude from the holding fixtures, but they are also open on the outside so that the torque transmission profile members are adapted to partly engage in the holding fixture. This permits better torque transmission between the base member and the torque transmission profile members. In addition, the torque transmission profile members protrude into the holding fixtures so that the latter fix the webbing retaining element in the axial direction.

Preferably each of the torque transmission profiles includes a recess which is adapted to positively receive and/or enclose the holding fixture at least in part as well as external locking teeth. In order to achieve better force transmission the holding fixtures extend in the axial direction into or completely through the torque transmission profiles so that direct force transmission from the base member to blocking teeth of a belt retractor and, resp., to the frame of a belt retractor is possible.

The torque transmission profile members can be, for example, injection molded parts that are especially made of plastic material. It is equally possible to configure them as sintered or cold solid forming parts.

For arranging the webbing retaining element to be centered on the axis of rotation the base member is preferably bent away from the axis of rotation in a receiving portion for the webbing so that a recess for the webbing retaining element is formed. Since the webbing retaining element is supported centrally on the axis of rotation, centric load transmission from the webbing retaining element to the base member may occur when the webbing is completely unwound.

Preferably the base member is configured so that damage of the webbing by the same is excluded. For this purpose, for example the edges of the stamped and bent part are rounded. Optionally it is also possible, however, that at the base member a protective member, especially made of plastic material, is provided which at least partially encloses the base member in the circumferential direction in the receiving portion for the webbing and extends in the direction of the axis of rotation over the entire receiving portion. The webbing is adjacent, especially in the wound-up state, to said protective member and not directly to the base member. Apart from the protection of the webbing, the diameter of the belt shaft can be increased by the protective member so that easy winding of the webbing on the belt shaft is possible.

For achieving the object furthermore a belt retractor for a seat belt in a vehicle is provided comprising a belt shaft according to the invention and a frame having two side flanges arranged in parallel and including an opening for receiving the belt shaft, and comprising two torque transmission profile members attached to the holding fixtures in the axial direction and extending into the openings.

The torque transmission profile members include locking teeth on the outside, for example, and the openings have counter-teeth corresponding to the locking teeth.

Preferably the base member extends through the torque transmission profiles into the openings of the flanges so that direct load transmission is possible from the base member and, resp., the belt shaft to the side flanges of the belt retractor.

Such belt retractor is especially suited for use in an end fitting tensioner. Accordingly, the belt shaft is twisted by a pyrotechnical tensioning drive in the winding direction via a wire rope.

BRIEF DESCRIPTION OF THE DRAWINGS

Further advantages and features will be evident from the following description in connection with the enclosed drawings, in which.

DESCRIPTION

Figure 1:
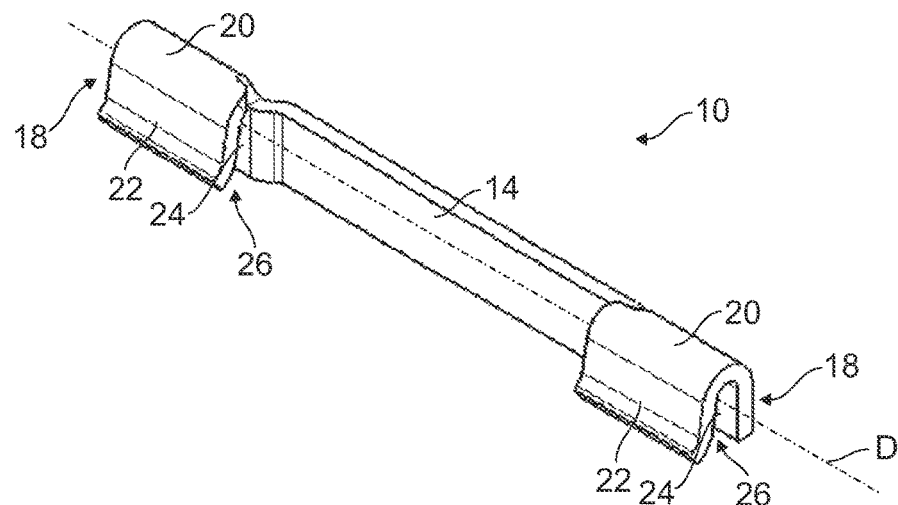
FIG. 1 shows a perspective view of a base member for a belt shaft according to the invention.
Figure 2:
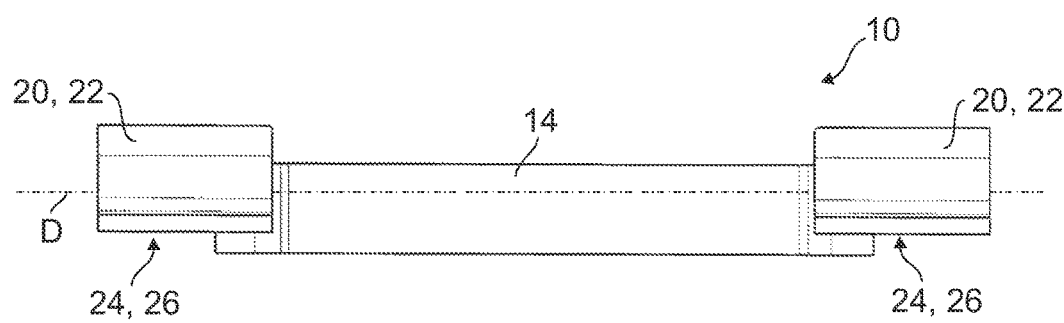
FIG. 2 shows a second view of the base member from FIG. 1.

In FIGS. 1 through 4 a base member 10 for a belt shaft 12 shown in FIGS. 4 through 10 is shown.

The oblong base member 10 includes a receiving portion 14 for a webbing retaining element 16 extending in the longitudinal direction of an axis of rotation D (cf. FIGS. 7 and 10) as well as two holding fixtures 20 for the webbing retaining element 16 provided at the axial ends 18 of the base member 10.

Each of the holding fixtures 20 is formed by a lateral tab 22 bent in U-shape (cf. FIG. 4) and forms an inserting passage 24 which is open on one side and extends transversely to the axis of rotation D and which includes an inserting opening 26. In this embodiment, the inserting passages 24 are opened not only transversely to the axis of rotation D but also in the direction of the axis of rotation D. As is evident especially in FIG. 4, the inserting passage 24 extends with respect to the axis of rotation D in the radial direction R.

Figure 3:
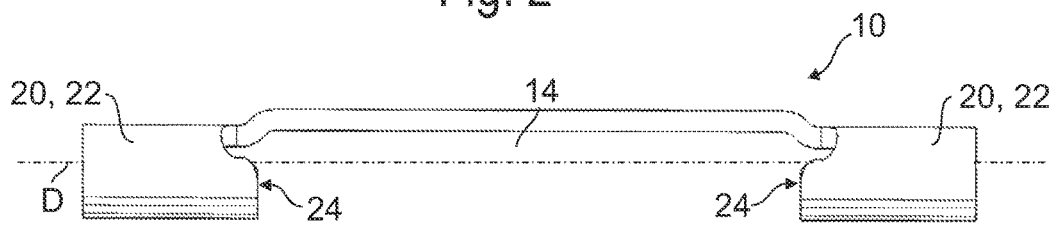
FIG. 3 shows a top view onto the base member from FIG. 1.
Figure 4:
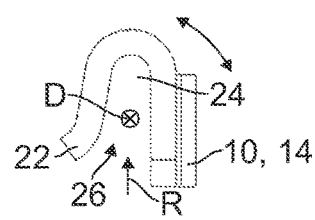
FIG. 4 shows a side view of the base member from FIG. 1.

The receiving portion 14 is laterally bent away from the axis of rotation D between the holding fixtures 20 and extends in parallel to the axis of rotation D so that the webbing retaining element 16 can be centrically supported on the axis of rotation D, as will be explained hereinafter (FIG. 3).

However, the axis of rotation extends through the inserting passages 24.

Figure 5:
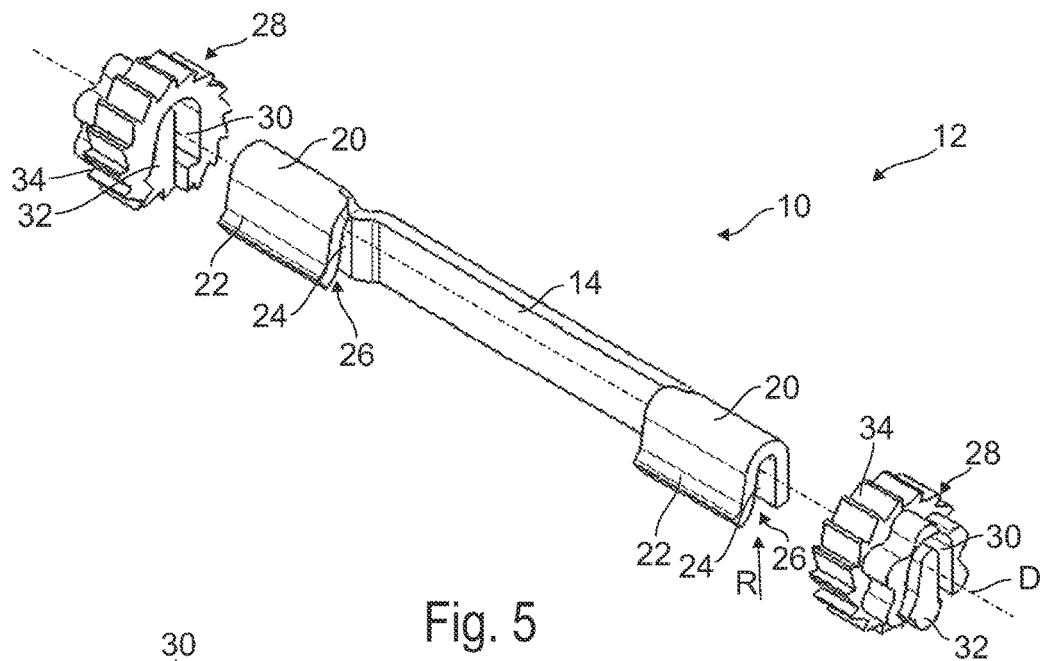
FIG. 5 shows a perspective exploded view of a belt shaft according to the invention including no webbing retaining element.
Figure 6:
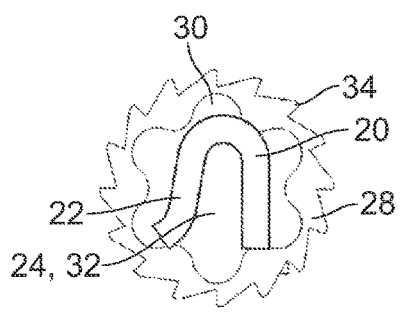
FIG. 6 shows a side view of the belt shaft from FIG. 5.
Figure 7:
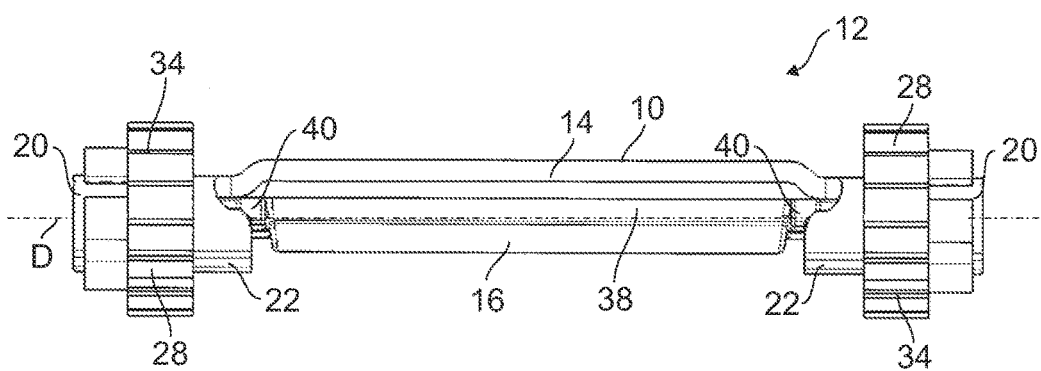
FIG. 7 shows a top view onto the complete belt shaft from FIG. 5 including the webbing retaining element.

Torque transmission profile members 28 are attached to the base member 10, as is evident, in FIG. 5. Each of the torque transmission profile members 28 includes a recess 30 adapted to positively receive and thus completely enclose the holding fixtures 20 in the circumferential direction U.

In the recesses 30 lands 32 laterally projecting into the inserting passages 24 of the holding fixtures 20 are provided.

On the outside of each of the torque transmission profile members 28 locking teeth 34 are provided. The torque transmission profile members 28 are attached to the holding fixtures 20 so that the holding fixtures 20 extend completely through the torque transmission profile members 28 in the axial direction.

The belt shaft 12 further comprises a webbing retaining element 16 to which webbing not shown here can be fastened. The webbing retaining element 16 has a retaining portion 38 extending in the longitudinal direction of the axis of rotation D as well as two retaining projections 40 protruding from the retaining portion 38 in the longitudinal direction. The retaining projections 40 are configured so that they are adapted to be inserted into the inserting passages 24 of the base member 10 in the radial direction R.

The webbing may be threaded onto the retaining portion 38 by a stitched loop, for example. Then the retaining projections 40 of the webbing retaining element 16 may be inserted into the inserting passages 24, thus fixing the webbing retaining element 16 on the base member 10.

The torque transmission profile members 28 can be attached before or after mounting the webbing retaining element 16.

In particular, the webbing retaining element 16 is adjacent to the torque transmission profile members 28 in the direction of the axis of rotation D so that the webbing retaining element 16 cannot be displaced in the direction of the axis of rotation D. The torque transmission profile members may also be configured so that they have to be attached after mounting the webbing retaining element and after being attached to the holding fixtures they prevent the retaining projections 40 from being removed from the inserting passages 24.

Figure 8:
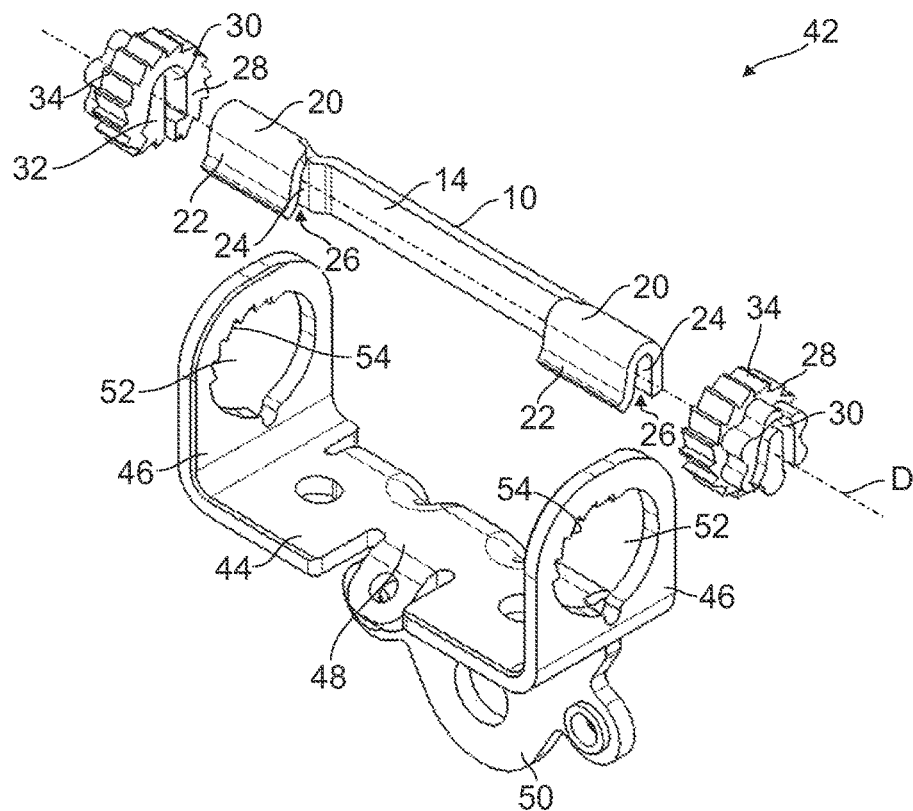
FIG. 8 shows an exploded view of a belt retractor according to the invention.
Figure 9:
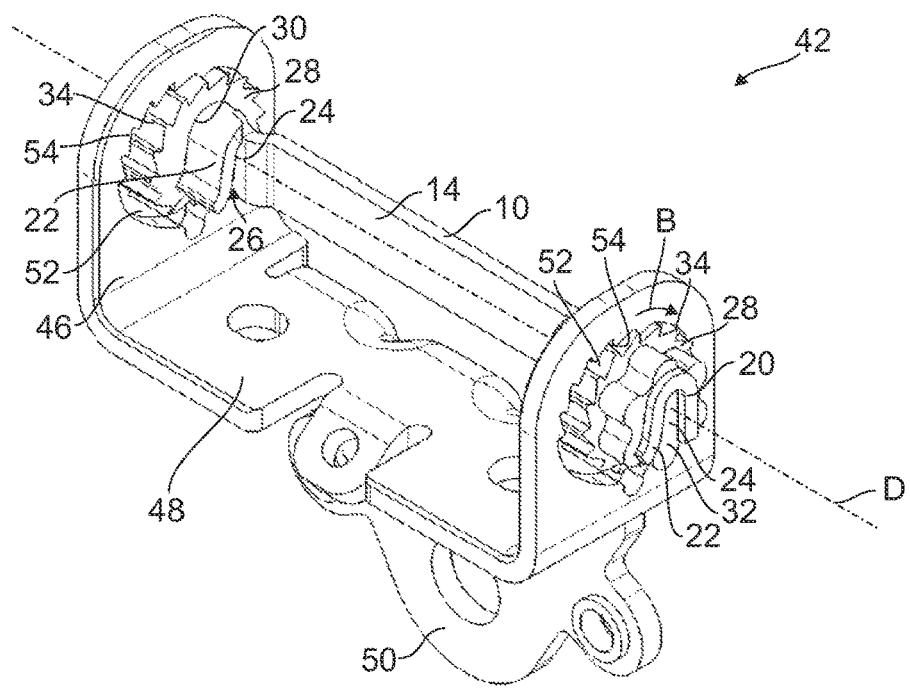
FIG. 9 shows the belt retractor from FIG. 8 in the assembled state.
Figure 10:
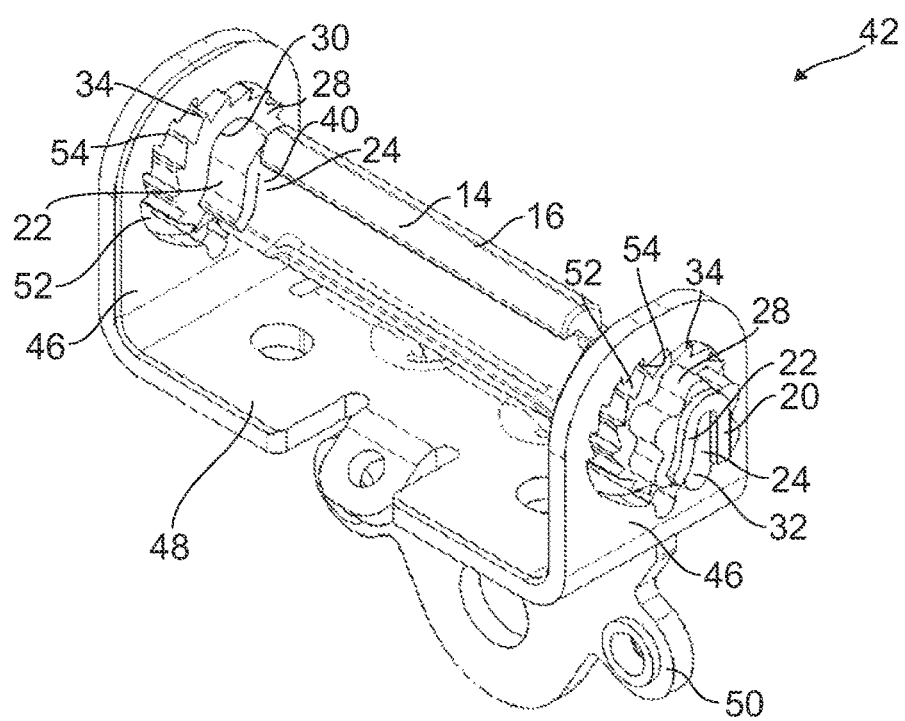
FIG. 10 shows the belt retractor from FIG. 9 including a mounted webbing retaining element.

In FIGS. 8 to 10 a belt retractor 42 including such belt shaft 12 is shown.

The belt retractor 42 includes a U-frame 44 comprising two parallel side flanges 46 and a central part 48 on which a mounting tab 50 is provided. On each side flange 46 an opening 52 for receiving the belt shaft 12 is provided.

Each of the openings 52 includes counter-teeth 54 corresponding to the locking teeth 34 of the torque transmission profile members 28, with the locking teeth 34 being adapted to engage said counter-teeth when the belt shaft 12 is shifted in a locking direction B.

In a first manufacturing step (FIG. 9) the torque transmission profile members 28 are attached to the holding fixtures 20 of the base member 10 and the belt shaft 12 is inserted in the frame 44 so that the torque transmission profile members 28 are supported in the openings 52.

Subsequently, the webbing retaining element 16 is inserted with the holding projections 40 into the inserting passages 24, as afore-described already, transversely to the longitudinal direction of the axis of rotation D, i.e. in the radial direction relative to the axis of rotation D in this case.

The belt retractor 42 and, resp., the components of the belt retractor 42 and of the belt shaft 12 thus may be supplied separately and may be assembled as late as during assembly of the entire belt retractor 42. Since the webbing may be mounted jointly with the webbing retaining element 16 only after assembly of the belt retractor 42, the assembly is substantially facilitated (FIG. 10).

As is evident from FIGS. 9 and 10, the base member 10 extends through the torque transmission profile members 28 into the openings 52 of the frame 44. In the case of locking of the belt retractor 42 and tensile force in the locking direction B, direct load transmission thus takes place from the base member 10 via the torque transmission profile members 28 to the side flanges 46 of the frame 44.

If the torque transmission profile members 28 exhibit no lands 32, it is also imaginable that the retaining projections 40 of the webbing retaining element 16 extend into the openings 52 so as to achieve direct load transmission.

In order to additionally prevent the webbing from damage on the base member 10 a protective element may possibly be provided which at least partially encloses the receiving portion 14 for the webbing in the circumferential direction and extends in the direction of the axis of rotation D over the entire receiving portion 14. In this way the webbing is not directly adjacent to the base member 10 but to the protective element. Moreover, the diameter of the belt shaft 12 is increased by the protective element, which facilitates winding of the webbing.

Since the receiving portion of the base member 10 extends away from the axis of rotation D, the webbing retaining element 16 is supported on the axis of rotation D so that a centric load transmission of the tensile force acting on the webbing to the belt shaft 12 is possible.

The torque transmission profile members 28 are injection molded parts, especially made of plastic or cast metal. Since they are manufactured separately from the belt shaft 12 and, resp., from the base member 10, easy adaptation to different frames or different locking shapes is possible. Alternatively, said torque transmission profile members can also be configured as sintered parts or as cold solid forming parts.

The invention claimed is:

1. A belt shaft (12) for a belt retractor (42) of a seat belt comprising a base member (10) extending in the longitudinal direction of an axis of rotation (D) to which the seat belt is fastened, wherein the base member (10) is a stamped and bent part,
   and wherein the base member (10) includes two holding fixtures (20) provided on each of the axial ends (18) of the base member (10) for a webbing retaining element (16) connected to webbing, the holding fixtures (20) being formed by lateral tabs (22) bent in a U-shape at the axial ends (18) of the base member (10).

2. The belt shaft according to claim 1, wherein each of the holding fixtures (20) includes an inserting passage (24) extending transversely to the axis of rotation (D) and extending in the radial direction (R) with respect to the axis of rotation (D), the inserting passage (24) being open on one side for receiving the webbing retaining element (16).

3. The belt shaft according to claim 2, wherein an oblong webbing retaining element (16) is provided which includes a retaining portion (38) for webbing and two retaining projections (40) protruding in the longitudinal direction, the retaining projections (40) being inserted in the inserting passages (24) of the holding fixtures (20) of the base member (10).

4. The belt shaft according to claim 1, wherein there are provided two torque transmission profile members (28) which are attached to the holding fixtures (20) in the direction of the axis of rotation (D).

5. The belt shaft according to claim 4, wherein each of the torque transmission profile members (28) exhibits a U-shaped recess (30) adapted to positively receive and/or enclose the holding fixture (20) at least partially and exhibits external locking teeth (34).

6. The belt shaft according to claim 1, wherein the base member (10) is bent away from the axis of rotation (D) in a receiving portion (14) provided on the base member (10).

7. The belt shaft according to claim 6, wherein the receiving portion (14) of the base member (14) extends between the axial ends (18) of the base member (14), the receiving portion (14) being laterally spaced further away from the axis of rotation (D) than the axial ends (18) of the base member (14).

8. The belt retractor (42) for a seat belt in a vehicle comprising a belt shaft (12) according to claim 1, a frame (44) including two side flanges (46) arranged in parallel and having an opening (52) for receiving the belt shaft (12), and comprising two torque transmission profile members (28) attached to the holding fixtures (20) in the axial direction and extending into the openings (52).

9. The belt retractor according to claim 8, wherein the torque transmission profile members (28) include locking teeth (34) on the outside and the openings (52) include counter-teeth (54) corresponding to said locking teeth (34).

10. The belt retractor according to claim 8, wherein the base member (10) extends into the torque transmission profile members (28) and into the openings (52) of the side flanges (46).

11. The belt shaft according to claim 1, wherein the webbing retaining element (16) is only supported at each of the axial ends (18) of the base member (10).

* * * * *